March 15, 1949. L. E. HUFFMAN ET AL 2,464,314
ALL-PURPOSE CLAMP ON BOX HANGER
Filed April 7, 1947
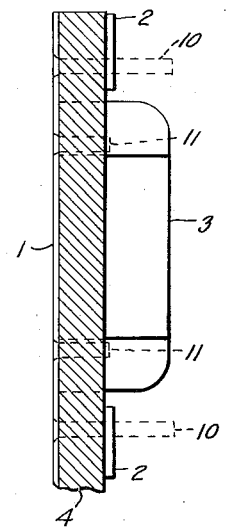
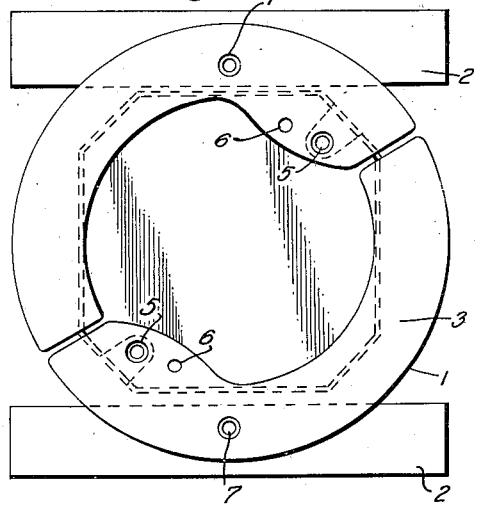
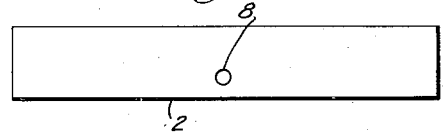
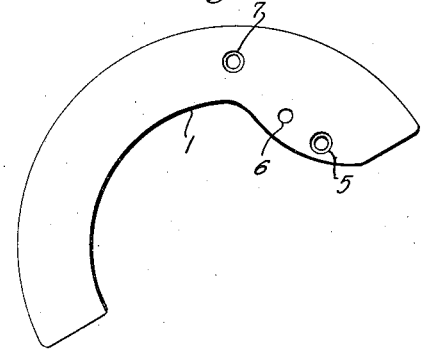
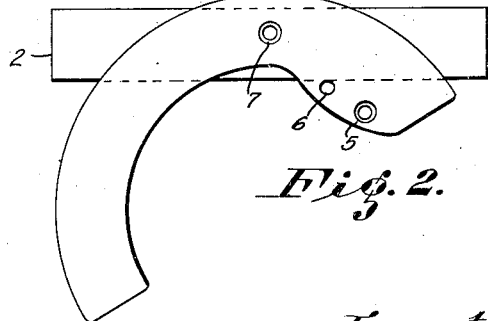
Inventors.
Lester Elbert Huffman
Clarence S. Huffman Patented Mar. 15, 1949

2,464,314

UNITED STATES PATENT OFFICE

2,464,314

ALL-PURPOSE CLAMP ON BOX HANGER

Lester Elbert Huffman and Clarence Sylvester Huffman, Rolla, Mo.

Application April 7, 1947, Serial No. 739,930

10 Claims. (Cl. 248—27)

The invention relates to an improvement in electric box hangers; and the objects of the invention are; first, to save time and labor; second, to always have box automatically in the proper place when bolts are tightened; third, to easily remove if desiring to add other outlets to the box; and fourth, to be used on any material which ceiling might be made of.

The form of the invention is illustrated in the accompanying drawing in which Figure 1, is a view of the entire hanger assembled; Figure 2, is a plan view of the hanger as it appears being disassembled; Figure 3, is a side view of the box and hanger as it would appear in the wall; Figure 4, is a view of the flat bar along with off-center hole; and Figure 5, is a view of circular bar to be used on the face of the box.

The circular bars 1, 1, and the flat bars 2, 2, constitute the entire hanger when assembled. Figure 1 shows 1, 1, as it would appear when assembled to box with bolts in holes 5, 5; the circular bars 1, 1, being fastened to bars 2, 2, with bolts 10, 10, through counter sunk holes 7, 7, while 6, 6, is threaded holes to which the light fixture will be hung.

Figure 2, is a view of the hanger being disassembled; after bolts have been removed from holes 5, 5, and bolts in hole 7, 7, have been loosened slightly, and B1, has been turned as is indicated in A1, box is let free.

To assemble, the hole must be cut where box 3, is to be placed, bars 2, 2, are put through opening and placed over small hole which has been drilled or cut to allow bolts 10, 10, to be placed, which clamps flat bars 1, 1, and circular bars 2, 2, on ceiling. When bars 1, 1, and 2, 2, have been fastened together with bolts 10, 10, the outside edge of circular bar is turned toward opening and box 3 inserted, after which circular bars are turned to proper position to where holes 5, 5, are fastened to hole 9, by bolts 11, 11.

We claim:

1. A hanger adapted for holding an electric outlet box in an opening in a support, comprising clamp structures each including connected bar elements in clamped engagement with the support, certain of the bar elements of the structures overlying a perimetral margin of the outlet box in the opening, and means connecting the outlet box to the last said bar elements.

2. A hanger adapted for holding an electric outlet box in an opening in a support, comprising clamp structures each including connected bar elements in clamped engagement with the support, one bar element of each clamp structure being of angulate extent, the angulate bar elements in assembly cooperating to form a substantially closed flange overlying a perimetral margin of the outlet box, and means connecting the outlet box and said angulate bars.

3. A hanger adapted for holding an electric oulet box in an opening in a support and for mounting an electric fixture adjacent the box, comprising clamp structures each including relatively straight and angulate bars in clamped engagement with the support adjacent the opening therein, said angulate bars cooperating to form a substantially continuous flange about a perimetral margin of the outlet box in said opening, means connecting the outlet box to the angulate bars, and said angulate bars having threaded openings for attachment of an electric fixture to the hanger.

4. A hanger for supporting an electric outlet box in an opening in a support, comprising first clamp bars in engagement with one side of the support adjacent the opening therein, second clamp bars located on the opposite side of the support adacent the opening, means extending through the opening in the support and connecting the first and second clamp bars in clamped engagement with the support, said second clamp bars in assembly having marginal portions thereof overlying a perimetral margin of the outlet box, and means connecting the outlet box to said second clamp bars.

5. A hanger for supporting an electric outlet box in an opening in a support, comprising first clamp bars on one side of the support adjacent the opening therein, second clamp bars on the opposite side of the support, means connecting the first and second clamp bars, permitting displacement of the second bars to initial positions such as to clear said opening for the insertion of an outlet box therein, said second clamp bars upon displacement thereof from said initial positions to assembly positions relative to the support opening and outlet box therein, overlying a perimetral margin of the outlet box, and means connecting the outlet box to said second clamp bars.

6. A hanger for supporting an electric outlet box in an opening in a support, comprising clamp bars engaging one side of the support adjacent the opening therein and each having a portion exposed in the opening, angulate clamp bars located on the opposite side of the support, securing elements connecting the angulate clamp bars to the exposed portions of the first said clamp bars, said securing elements being adjustable for permitting displacement of said angulate bars to initial positions such as to clear the opening in the support for insertion of an outlet box therein, said angulate clamp bars upon displacement from said initial positions to assembly positions relative to the opening and outlet box, overlying a perimetral margin of the outlet box, said securing elements serving in the assembly positionment of said angulate clamp bars, to secure the latter and the first said clamp bars in clamped engagement with the support, and means providing an assembly connection of the outlet box to said angulate clamp bars.

7. A hanger for supporting an electric outlet box in an opening in a support, comprising complemental structures each formed to provide a flat clamp bar having a threaded opening intermediate its length, a securing element having a threaded portion received in said threaded opening of the flat clamp bar, and a second clamp bar of an angulate trend between its ends, pivotally mounted on said securing element.

8. A hanger for supporting an electric outlet box in an opening in a support, comprising complemental structures each formed to provide a flat, substantially rectilinear clamp bar having a threaded opening intermediate its length, a securing element having a threaded portion received in said threaded opening of the clamp bar, and a flat, substantially semi-circular clamp bar pivotally mounted on said securing element.

9. A hanger for supporting an electric outlet box in an opening in a support, comprising complemental structures each formed to provide a flat, substantially rectilinear clamp bar having a threaded opening intermediate its ends and offset relative to the longitudinal axis of the bar, a securing element having a threaded portion received in said threaded opening of the bar, and a flat, semi-circular clamp bar pivotally mounted on said securing element, said semi-circular bar having an opening therein to receive an attachment element provided for connecting an outlet box to the bar.

10. A hanger for supporting an electric outlet box in an opening in a support and for supporting an electric fixture adjacent the outlet box, comprising complemental structures each formed to provide a flat clamp bar having a threaded opening intermediate its ends, a securing element having a threaded portion received in said threaded opening of the bar, and a flat, curved clamp bar pivotally mounted on said securing element, said curved clamp bar having relatively adjacent openings therein, one of said openings serving to receive an attachment element provided for connecting an outlet box to the bar and the other opening being threaded for attachment of an electric fixture to the bar.

LESTER ELBERT HUFFMAN.
CLARENCE SYLVESTER HUFFMAN.

REFERENCES CITED

The following references are of record in the file of this patent:

UNITED STATES PATENTS

| Number | Name | Date |
|---|---|---|
| 2,089,390 | Mangin | Aug. 10, 1937 |
| 2,374,993 | Haynes | May 1, 1945 |